United States Patent [19]

Tasdemiroglu

[11] Patent Number: 4,664,967
[45] Date of Patent: May 12, 1987

[54] BALLISTIC SPALL LINER

[75] Inventor: Server Tasdemiroglu, Oakland County, Mich.

[73] Assignee: The United States of America as represented by the Secretary of the Army, Washington, D.C.

[21] Appl. No.: 854,457

[22] Filed: Apr. 21, 1986

[51] Int. Cl.⁴ ............................................. B32B 3/12
[52] U.S. Cl. ................................. 428/220; 89/36.01; 428/252; 428/285; 428/911
[58] Field of Search ............... 428/911, 220, 252, 285; 89/36 A

[56] References Cited

U.S. PATENT DOCUMENTS

| | | | |
|---|---|---|---|
| 2,562,951 | 8/1951 | Rose et al. | 154/52.5 |
| 2,697,054 | 12/1954 | Dietz et al. | 154/52.5 |
| 3,575,786 | 4/1971 | Baker et al. | 161/165 |
| 4,404,889 | 9/1983 | Miguel | 428/911 |
| 4,529,640 | 7/1985 | Brown | 428/911 |

OTHER PUBLICATIONS

3M Co., Product Specification 4693 Plastic Adhesive, Mar. 1, 1969, revised Jul. 1, 1983.

Primary Examiner—Marion C. McCamish
Attorney, Agent, or Firm—Peter A. Taucher; Gail S. Soderling

[57] ABSTRACT

A lightweight, economical, add-on armor plate, ballistic spall liner, installable on the inner surfaces of unprotected vehicles, structures, or other craft. The spall liner provides additional protection to vehicle occupants and internal equipment from the risk of injury or damage due to flying metallic debris, "spall", caused by ballistic damage to the vehicles or the structure's interior when a munitions-type projectile penetrates a wall. The spall liner is a laminate made from layers of high tensile strength, woven fabric such as polyaramid fabric or ballistic nylon which are bonded together with at least one reinforcing layer of martensite sheet steel interposed between the woven fabric layers. The spall liner controls the spall generated by the penetration of a munitions-type projectile by dissipating the projectile's force, framentizing the projectile, and trapping the fragments in the spall liner's interior.

8 Claims, 4 Drawing Figures

BALLISTIC SPALL LINER

GOVERNMENT INTEREST

The invention described herein may be manufactured, used and licensed by or for the Government for governmental purposes without payment to me of any royalty thereon.

BACKGROUND AND SUMMARY OF THE INVENTION

This invention relates to add-on armor plates, installable on the inner surfaces of "unprotected" vehicles, structures, or other craft. That is, vehicles, structures, or other craft, (such as aircraft), having walls which are not constructed of armor plate. Add-on armor plates provide additional protection to vehicle occupants and internal equipment against the risks of injury or damage due to high explosive anti tank (HEAT) rounds and kinetic energy rounds, as well as small arms fire. When a munition type projectile penetrates an unprotected wall surface of a vehicle, structure or other craft, an extremely dangerous, life-threatening situation is created, not only by the round itself but also by flying metallic debris caused by the ballistic damage to the vehicle's interior as the round penetrates. The flying, metallic debris, is known as "spall". This "spalling" effect greatly increases the risk of death or disablement of the vehicle's crew and occupants. Further, it can severely damage a vehicle's internal equipment, especially electronic and communication equipment, including computer systems which are now an integral part of many military vehicles.

The use of ballistic spall liners installed adjacent to the inner surface of a wall, roof or other vehicle structure, to control and supress the spall generated when a projectile penetrates the vehicle's interior is well known. (See for example U.S. Pat. No. 3,575,786). Ballistic spall liners, to be practical, however, must not only possess the capability to control and supress spall, but must also be designed to minimize disadvantages associated with all types of armor plate, i.e., excessive weight and, excessive thickness. To avoid these disadvantages, especially excessive weight, the use of various non-metallic materials, such as ceramic fiber and high tensile strength woven fabrics (such as polyaramid fabric and nylon) have been explored. Materials of this type yield when impacted by a projectile, thereby allowing the woven strands to act in cooperation to absorb the projectile's energy (see for example U.S. Pat. No. 2,697,054). Although the use of such non-metallic materials in ballistic spall liners has resulted to some extent in providing the advantage of reduced weight, the disadvantages of excessive spall liner thickness and high cost have remained. For example, a ballistic spall liner comprised of 34 layers of polyaramid fabric bonded together with a resinous adhesive into a class B laminate in accordance with U.S. Military specification, Number MIL-L-62474B(AT), 25 June 1984, has a ballistic limit of approximately 2400 ft/sec against a .30 caliber Fragment Simulator. While the weight of such a ballistic spall liner is acceptable at approximately 4.5 lbs/sq ft, the liner is excessively thick, at approximately ¾", and very expensive at approximately $70/sq ft.

Non-metallic spall liners (such as a 34 ply polyaramid fabric liner) generally must be positioned a distance of approximately 12-14 inches away from the surface of an unprotected wall, in order to provide adequate ballistic protection. This unfortunately results in a great deal of trapped space which is unavailable for use. My invention, however, can be placed directly against the unprotected wall and still provide adequate ballistic protection. The best results should be obtained however if my ballistic spall liner is positioned approximately 2 inches from the inner side of the unprotected wall. Even with this 2 inches of lost, trapped space, my invention still allows significantly more untrapped space available for use, than does a spall liner made from all non-metallic materials. As such, a typical four sided structure, such as a military vehicle, may have its internal cargo and/or crew compartment increased by up to 10 to 12 additional inches of usable space in each direction by using my spall liner rather than a non-metallic spall liner.

It is an object of my invention to provide an improved ballistic spall liner usable on military vehicles, vessels, aircraft, and other structures, or as a portable shield, to provide acceptable ballistic protection at a relatively low cost without being excessively heavy or excessively thick.

It is also an object of my invention to provide ballistic spall liners of different design and composition for use on different interior wall surfaces. The design and composition of spall liners for vertical walls, which are vulnerable to the increased threat from direct fire weapons, must provide substantially better ballistic protection than spall liners for the horizontal (roof) surfaces, which are vulnerable to the lesser threat from overhead projectiles.

The aforesaid objects of the invention and other objects, which will become apparent as the description proceeds are achieved by providing a ballistic spall liner which is a laminated structure, composed of a plurality of high tensile strength, fabric layers. Each fabric layer is comprised of at least 3 plies of high tensil strength, fabric, bonded together with a resinous adhesive into a sublaminate. The laminated structure is reinforced by at least one layer of high tensil strength (minimum 220,000 p.s.i.), martensite sheet steel, interposed between the fabric layers. When a projectile penetrates the spall liner, individual plies of fabric undergo delaminating actions within a constrained area near the projectile's path. Successive layers of the spall liner begin to recede at the point of impact, forming a bulge within the interior of the liner. The steel sheets help to contain the bulge, fragment the projectile, and trap the fragments within the bulge. Unpenetrated fabric layers downstream from the steel sheet act in tension to absorb forces not contained by the steel.

DETAILED DESCRIPTION OF THE DRAWINGS

Figure 1:
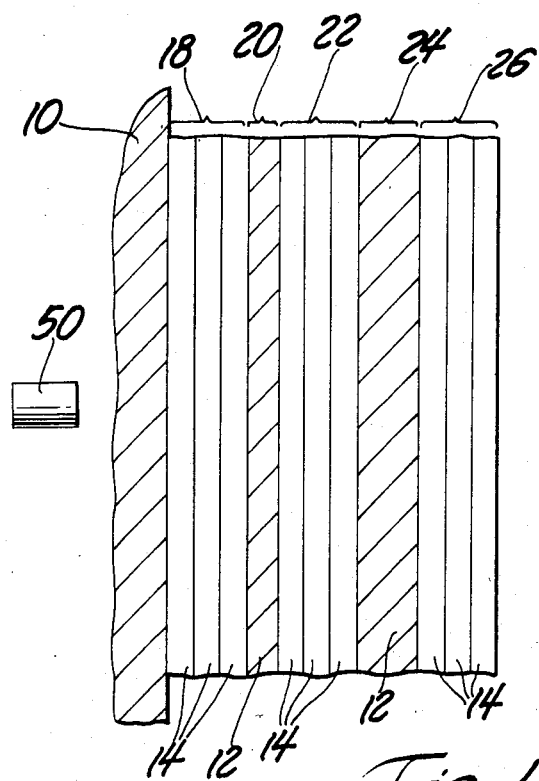
FIG. 1 is a cross sectional view of a spall liner of this invention.

Referring to the accompanying drawing in which like numerals refer to like parts, FIG. 1 illustrates an embodiment of my invention which may be used to provide protection from the spall generated when a projectile penetrates a vertical, unprotected wall. FIG. 1 depicts a spall liner made from a laminate of high tensil strength, fabric 14, such as polyaramid fabric or ballistic nylon, and martensite sheet steel 12 having a design tensil strength of at least 220,000 psi.

The spall liner depicted in FIG. 1 is a semi-rigid shield which may be installed by a variety of means. It may be riveted directly to the inner wall surface 10, held securely in place by brackets, or slidably mounted adjacent the unprotected wall in channels designed to receive and firmly hold the shield in position facing the wall. Any means which will hold the shield rigidly in place, facing the unprotected wall 10, either against or within a few inches of the wall surface will suffice.

As shown in FIG. 1 my spall liner shield for protecting vertical walls can be a five layered laminate. The first, third and fifth layers are fabric sublaminates made of very thin plys of cloth bonded together with a resinous adhesive having good bonding properties, but which will give and permit the plies to separate rather than shatter upon the impact of a penetrating projectile. The second and fourth layers of the spall liner are metal. A delaminating base layer 18, faces the inner side of the unprotected wall surface 10, and is positioned either directly adjacent (as illustrated) or a few inches from the wall. The delaminating base layer 18 is itself actually a laminate (sublaminate) comprised of at least three plies of high tensile strength, fabric 14. The fabric must be made from fibers which tend to stretch rather than shatter when impacted, such as a polyaramid fabric, a ballistic nylon fabric, spun glass or the like, either alone or in combination. A polyaramid fabric, should meet the Class B standards set forth in U.S. Military Specification, MIL-L-62474B(AT) dated 25 June 1984 and a ballistic nylon fabric, should meet the standards set forth in U.S. Military Specification, MIL-C-12369F(GL), dated 28 June 1974. The plies of polyaramid fabric are bonded together with resinous adhesive. One acceptable resin is a mixture based on phenol formaldehyde and polyvinyl butyral described in U.S. Military Specification, MIL-L-62474B(AT). The adhesive employed in bonding the plies together is impregnated uniformly throughout the fabric plies. The bonding adhesive is applied in a manner well known in the trade, such as by spreading, followed by curing at elevated temperatures and pressures. Lamination pressures and temperatures for bonding the fabric plies will vary according to the type of resin employed. (See U.S. Pat. No. 2,697,054). Care must be taken however not to employ a temperature so high that it damages the fabric. After curing, a delaminating base layer 18, comprised of at least 3 plies of polyaramid fabric will have a thickness of at least approximately 0.07 inches. A base layer 18, comprised of ballistic nylon fabric, will have a thickness of at least approximately 0.08 inches. Two other fabric layers of the ballistic spall liner laminate, a delaminating intermediate layer 22 and an elongating outer layer 26, may be formed in the same or a similar manner as the base layer 18.

Adjacent to the delaminating base layer 18, in the five layered spall liner laminate, is a first continuous facing layer of martensite sheet steel 20, having a minimum design tensile strength of at least 220,000 psi. Martensite steel 12 is a low carbon, alloy-free, cold rolled steel. The first stage of its manufacture follows the same process as that used to produce low to intermediate carbon cold rolled steel and is well known in the art. After cold rolling, the steel coils are processed through a continuous anneal line where they are heated treated to the austenitic range (approximately 1750° F.). The steel is then rapidly water quenched to room temperature to produce a tempered martensite steel. Typical composition of the martensite steel will include approximately 0.21 percent carbon and approximately 0.45 percent manganese.

Adjacent the first continuous facing layer of martensite sheet steel 20, (on the side opposite the base layer 18) is the delaminating intermediate layer 22, which like the base layer 18, is a sublaminate composed of at least 3 plies of high tensile strength, fabric 14. Adjacent to the delaminating intermediate layer 22, (in the direction away from the unprotected wall surface 10), is the next layer in the spall liner laminate. It is a second continuous facing layer of martensite sheet steel 24 (minimum tensile strength 220,000 psi). The elongating outer layer 26, of the laminate, is adjacent the second continuous facing layer of martensite sheet steel 24, (on the side opposite the intermediate layer 22). As indicated above, the elongating outer layer 26 has at least 3 plies of high tensile strength fabric 14 and is made in the same or similar manner as the base layer 18 and the intermediate layer 22.

The five layers of the spall liner laminate, (i.e. the base layer 18, the first continuous facing layer of martensite sheet steel 20, the intermediate layer 22, the second continuous facing layer of martensite sheet steel 24 and the outer layer 26) can be bonded together with an adhesive having high bond strength to metals and plastics, such as "Scotch Grip" Plastic Adhesive No. 4693 available from Minnesota Mining & Manufacturing, Co., St. Paul, MN. "Scotch Grip" 4693 has an elastomeric base and uses methylene chloride cyclohexane as a solvent. Information on its properties, characteristics and directions for use are found in the 3M Co. Product Specification 4693, dated Mar. 1, 1969, revised July 1, 1983. The adhesive is spread uniformly over the surface of each layer and cured at room temperature under slight pressure for about 24 hours to ensure that the adhesive is dry and the layers satisfactorily bonded. If desired, the adhesive may also be forced dried at 180° F. under firm pressure . The bonded laminate must be cured adequately to ensure the permanent adherence of all five layers into one rigid, laminated structure.

A ballistic spall liner constructed as set forth above, using either polyaramid fabric or ballistic nylon in conjunction with martensite sheet steel, compares very favorably to ballistic spall liners constructed only of nonmetallic material, such as a laminate made only from polyaramid fabric. As illustrated by the table below both the ballistic nylon and steel spall liner and the polyaramid and steel spall liner of my invention should provide the same ballistic protection (V50 ballistic test limit) as a spall liner of more than twice the thickness, made only of laminated polyaramid fabric. Also as illustrated below, the protection provided by my invention is far more economical. This increased protection is gained at a large cost savings and minimal weight penalty. In cases where that difference is important, much of the weight difference can be eliminated by the means used to install the ballistic spall liner. Because the spall liner of my invention is rigid, it can be riveted directly to the wall surface. A spall liner made only of laminated polyaramid fabric however is not rigid. As such, some type of framework, usually made of steel, must be used to hold the non-metallic ballistic spall liner shields rigidly in place. The weight of this framework is not computed in the table below. When that weight is considered, the weight of a spall liner constructed according to my invention would compare favorably to the weight of a non-metallic polyaramid fabric liner.

| Type of Spall Liner | Thickness (inches) | Weight (lbs/sq ft) | Cost ($/sq ft) | Ballistic Limit (ft/sec) |
|---|---|---|---|---|
| Non-metallic polyaramid fabric | 0.750 | 4.65 | $69.75 | 2400 |
| Ballistic-nylon and martensite steel | 0.320 | 4.71 | $8.63 | 2350–2600 est. |
| Polyaramid fabric and martensite steel | 0.287 | 4.90 | $23.96 | 2400–2600 est. |

Figure 3:
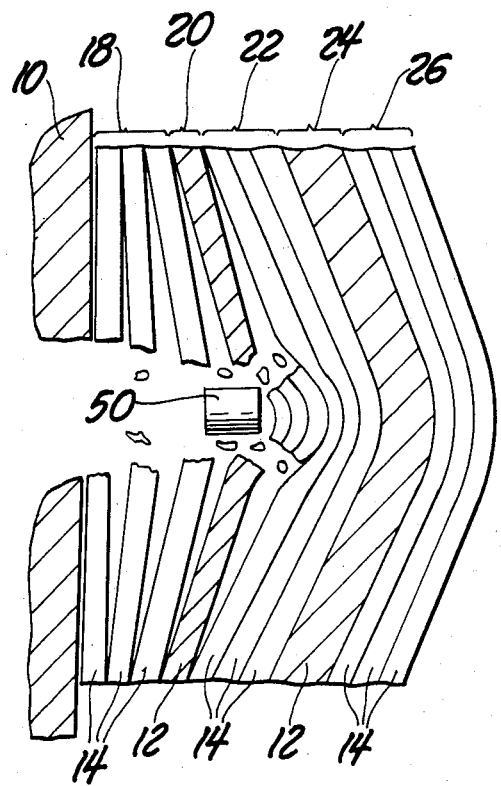
FIG. 3 is a cross sectional view of FIG. 1 illustrating a projectile penetrating the spall liner.
Figure 4:
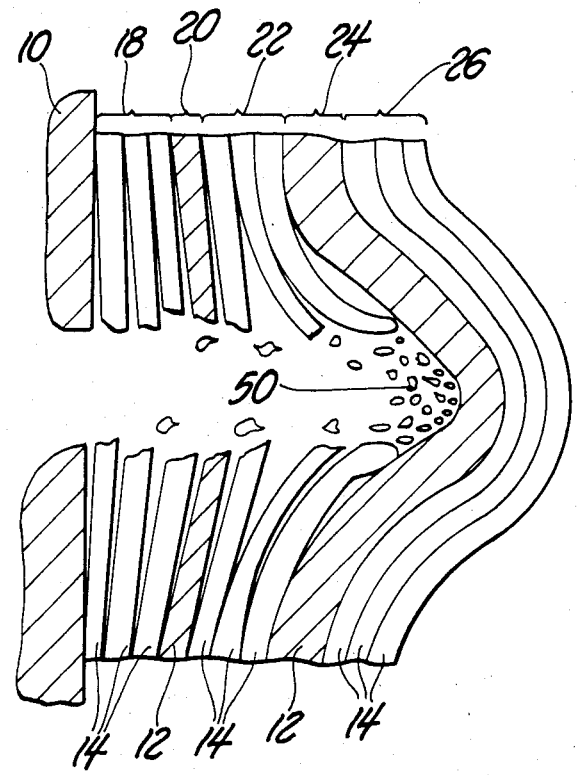
FIG. 4 is a cross sectional view of FIG. 1 illustrating the reaction which occurs within the spall liner as a penetrating projectile is fragmented upon impacting the second layer of steel.

FIGS. 3 and 4 illustrate the dynamics of how my fabric 14 and steel 12 ballistic spall liner would function upon the impact and penetration of a munitions type projectile 50, such as a .30 caliber bullet or shell fragment. The projectile 50, penetrates, locally shattering the unprotected wall surface 10, and the first three plies of fabric 14 comprising the base layer 18 and the first layer of martensite sheet steel 20, with a punching, shear force as shown in FIG. 3. The remaining layers of the liner laminate 22, 24, 26 recede in the direction of the projectile's path, bending away from the point of the projectile's impact. The bending of the fabric plies 14, of the intermediate layer 22 dissipates force imparted by the projectile in a lateral direction, normal to the path of the projectile 50. As the projectile 50 continues laminate layers 22, 24, 26 recede, elongating in tension. As the individual plies of fabric 14 in the base layer 18 (and later in the intermediate layer 22) are penetrated they return somewhat toward their former position, causing a delaminating effect within a constrained area of the layer near the point of the projectile's path thereby further dissipating force. The impact of the projectile 50 on the layers ahead of it is further lessened by the reduction of mass in front of the projectile 50 and the increase in the deflection of the remaining layers 22, 24, 26.

As illustrated in FIG. 4 the fabric plies of the intermediate layer 22 are stretched and bent to the breaking point, creating a further constrained delaminating effect. The projectile 50, which lost much of its energy after penetrating through the delaminating base layer 18, the first layer of martensite sheet steel 20 and the delaminating intermediate layer 22, is fragmented upon reaching and impacting the second layer of martensite sheet steel 24. Although this impact does impart significant force to the second martensite sheet steel layer 24 and the outer layer 26, those layers are not penetrated, but rather, they further recede to form a large bulge. The fabric plies 14, in the elongating outer layer 26 act in tension to absorb the forces not contained by the second martensite sheet steel layer 24.

Figure 2:
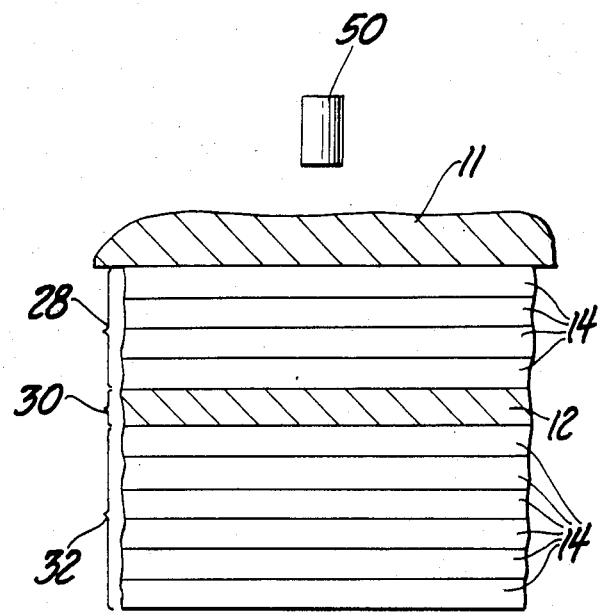
FIG. 2 is a cross sectional view of a second spall liner.

FIG. 2 illustrates an embodiment of my invention which may be used to provide protection from the spall generated when a projectile 50 from overhead strikes an unprotected roof surface 11. Roof surfaces are generally not exposed to direct fire weapons, and are usually vulnerable only to indirect fire and flying debris. As such, they require less ballistic protection than vertical walls. Reducing the amount of ballistic protection, provides the added advantages of less weight and further reduction in spall liner thickness.

FIG. 2 depicts a spall liner design which incorporates a 3 layer laminate construction. A delaminating top layer 28, is adjacent as illustrated the unprotected roof surface 11 and is composed of at least four plies of high tensil strength, fabric 14. As with the spall liner for vertical walls (shown in FIG. 1), fabric such as ballistic nylon fabric or polyaramid fabric may be used. The fabric plies (sublaminate) which comprise the top layer 28 are bonded together in the same manner as are the base layer 18, intermediate layer 22, and outer layer 26 of FIG. 1 as described in detail above. As the top layer 28 of FIG. 2 is comprised of at least four plies of woven fabric however, it will be thicker, measuring at least approximately 0.09" (if made from polyaramid fabric plies) and approximately 0.10" (if made from ballistic nylon plies).

Adjacent the delaminating top layer 28 (on the side opposite the unprotected roof surface 11) is a continuous facing layer of martensite sheet steel 30, having minimum design tensile strength of at least 220,000 psi. An elongating bottom layer 32, is adjacent the layer of martensite sheet steel 30, (on the side opposite of the top layer 28). The bottom layer 32 like the top layer 28 is also comprised of a high tensile strength fabric 14 sublaminate which like the top layer 28 is also made in the same or similar manner as the base layer 18, intermediate layer 22, and outer layer 26, of FIG. 1. The elongating bottom layer 32 however, is comprised of at least six plies of fabric 14, (such as six polyaramid fabric plys bonded together in a sublaminate of at least approximately 0.13" total thickness or six plies of ballistic nylon bonded together in a sublaminate of at least approximately 0.15" total thickness.

The dynamics of the FIG. 2 spall liner design upon being penetrated by a .30 caliber projectile or shell fragment is very similar to that of the spall liner for vertical walls depicted in FIGS. 3 and 4. As a projectile which penetrates an unprotected roof surface is generally not from a direct fire weapon (but instead is generally the result of indirect fire shrapnel and debris), it has less force. Consequently less ballistic protection is necessary. The fabric plies 14 of the delaminating top layer 28 will recede before the projectile 50 as it penetrates the spall liner, bending and breaking those plies and causing a constrained delaminating effect within the top layer 28. This results in the dissipation of some of the projectile's force along the fabric plies of the top layer 28, in a lateral direction, normal to the projectile's path. The martensite sheet steel layer 30 will bulge into the elongating bottom layer 32 under the impact of the projectile. The fabric plies of the elongating bottom layer 32 will act in tension to absorb the forces not contained by the martensite sheet steel layer 30. The less forceful projectile is fragmented upon impact with the martensite sheet steel layer 30 and the fragments are trapped in the bulge which has been formed in the liner's interior. As shown by the following table, both the ballistic nylon and steel and the polyaramid and steel spall liners of my design, compare very favorably with a ballistic spall liner designed to provide protection for roof surfaces, which is made from only non-metallic materials such as a polyaramid fabric laminate.

| Type of Spall Liner | Thickness (inches) | Weight (lbs/sq ft) | Cost ($/sq ft) | Ballistic Limit (ft/sec) |
|---|---|---|---|---|
| Non-metallic polyaramid fabric | 0.375 | 2.33 | $34.95 | 1500 |
| Ballistic Nylon and martensite | 0.285 | 2.38 | $5.31 | 1500–1600 est |

-continued

| Type of Spall Liner | Thickness (inches) | Weight (lbs/sq ft) | Cost ($/sq ft) | Ballistic Limit (ft/sec) |
|---|---|---|---|---|
| steel | | | | |
| Polyaramid fabric and martensite steel | 0.237 | 4.90 | $23.96 | 1500–1650 est |

Many changes and modifications in the above described embodiments of my invention can of course by carried out without departing from the scope thereof. Accordingly, the scope of this invention is intended only to be limited by the scope of the appended claims.

What is claimed is:

1. A laminated spall liner for controlling spall generated by the penetration of a projectile comprising:
    a delaminating base layer comprised of at least three plies of a high tensile strength fabric bonded with a resinous adhesive to form the delaminating base layer, which upon impact by the projectile undergoes local shattering and a delaminating effect within a constrained area as the projectile penetrates through each fabric ply, thereby dissipating the projectile's force;
    a first continuous facing layer of martensite sheet steel adjacent the base layer, said first layer of martensite sheet steel having a minimum design tensil strength of at least 220,000 psi;
    a delaminating intermediate layer, comprised of at least three plies of a high tensile strength fabric, bonded with a resinous adhesive to form the delaminating intermediate layer, located adjacent the first layer of martensite sheet steel, the delaminating intermediate layer having fabric plies which recede in the direction of the penetrating projectile's path, and bend, elongating in tension to the point of separation, thereby further dissipating the projectile's force in a lateral direction, normal to the projectile's path;
    a second continuous facing layer of martensite sheet steel having a minimum design tensil strength of 220,000 psi, located adjacent the delaminating intermediate layer, the second steel layer recedes, bulging under the projectile's impact and framents the projectile, trapping the fragments within the bulge;
    an elongating outer layer, comprised of at least three plies of high tensile strength fabric, bonded with a resinous adhesive to form the elongating outer layer, located adjacent to the second layer of martensite sheet steel, the elongating outer layer having fabric plies which act in tension to absorb forces not contained by the second martensite sheet steel layer;
    each of the layers being bonded to adjacent layers with a plastic resinous adhesive, to form a rigid, laminated armor plate liner having a thickness of at least approximately 0.29".

2. The laminated ballistic spall liner of claim 1 wherein the high tensile strength fabric is ballistic nylon.

3. The laminated ballistic spall liner of claim 1 wherein the high tensile strength fabric is polyaramid fabric.

4. The laminated ballistic spall liner of claim 1 wherein at least one of the plies of high tensile strength, fabric is polyaramid fabric and the other plies of high tensile strength fabric are ballistic nylon.

5. A laminated spall liner for controlling spall generated by the penetration of a projectile, comprising:
    a delaminating top layer, comprised of at least four plies of a high tensile strength fabric bonded with a resinous adhesive to form the delaminating top layer, so that the individual plies of the top layer recede before the penetrating projectile, bend and break, causing a constrained delaminating effect within said delaminating top layer, thereby dissipating the projectile's force;
    a continuous facing layer of martensite sheet steel having a minimum design tensile strength of 220,000 psi, located adjacent the delaminating top layer, the layer of martensite sheet steel recedes, bulging under the projectile's impact and framents the projectile, trapping the fragments within the bulge;
    an elongating bottom layer, located adjacent the layer of martensite sheet steel, comprised of at least six plies of high tensil strength fabric, bonded with a resinous adhesive, to form the elongating bottom layer so that the plies of the elongating bottom layer act in tension to absorb forces not contained in the martensite sheet steel layer;
    each of the layers being bonded to adjacent layers with a plastic resinous adhesive, to form a rigid, laminated armor plate liner having a thickness of at least approximately 0.25".

6. The laminated ballistic spall liner of claim 5 wherein the high tensile strength fabric is ballistic nylon.

7. The laminated ballistic spall liner of claim 5 wherein the high tensile strength fabric is polyaramid fabric.

8. The laminated ballistic spall liner of claim 5 wherein at least one of the plies of high tensile strength fabric is polyaramid fabric and the other plies of high tensile strength, fabric are ballistic nylon.

* * * * *